Feb. 22, 1927.
C. W. COGHILL
ANIMAL TRAP
1,618,513
Filed July 10, 1926
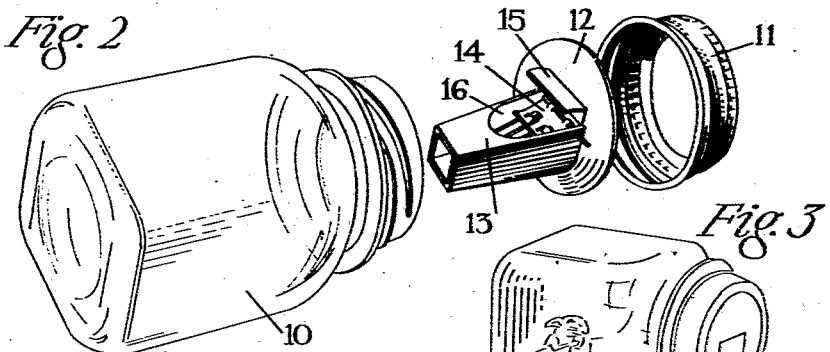
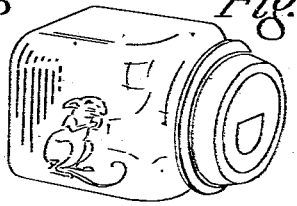
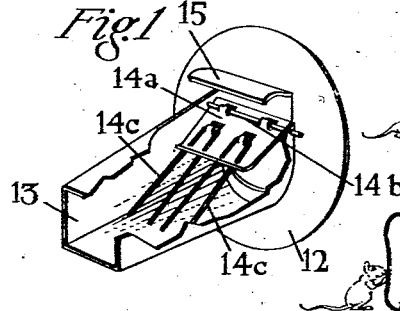
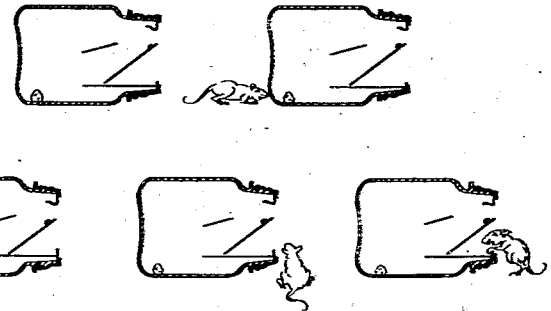
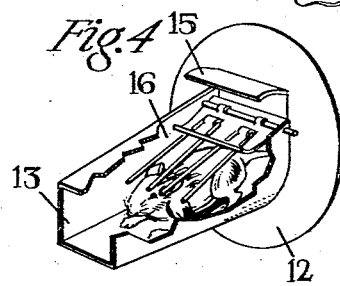
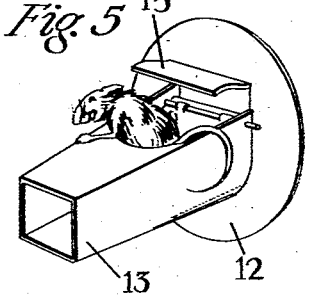
Inventor
C. W. COGHILL
By Emil F. Lange
Attorney Patented Feb. 22, 1927.

1,618,513

UNITED STATES PATENT OFFICE.

CHARLES W. COGHILL, OF FAIRBURY, NEBRASKA, ASSIGNOR OF ONE-HALF TO CHARLES H. WELLS, OF ENDICOTT, NEBRASKA.

ANIMAL TRAP.

Application filed July 10, 1926. Serial No. 121,624.

My invention relates to animal traps and more particularly to mouse traps of the kind which is adapted to be used with Mason jars or the like. Among the objects of my invention is the provision of a trap attachment for Mason jars, the attachment being of extreme simplicity of construction and in use, positive and reliable in action and attractive in appearance. Especially is it my object to so construct the trap attachment that escape of the mouse is impossible and so that the mouse when making efforts to escape will be perplexed at finding escape to be impossible when it appears to be easy.

Having in view these objects and others which will be pointed out in the following description, I will now refer to the drawings, in which—

Figure 1 is a view in perspective of the mouse trap attachment for Mason jars, a portion being broken away to disclose the structure of the trap door.

Figure 2 is a view in perspective of the Mason jar, its cap and my trap attachment.

Figure 3 is a perspective view showing the assembled relation of the three parts shown in Figure 2.

Figure 4 is a view in perspective of the trap attachment showing the manner in which a mouse enters the funnel.

Figure 5 is a similar view showing the manner in which the mouse leaves the funnel in its unsuccessful attempt to escape.

Figure 6 is a strip showing the entire trap in diagrammatic form and showing all the movements of a mouse from the time when it approaches the trap until after its first attempt to escape.

The Mason jar 10 as shown in Figure 2 serves as the chamber in which the live mouse is trapped. Such jars at present are obtainable in the square form shown in the figures and this form is somewhat better adapted for use as a mouse trap than the more common round form. When a round Mason jar is employed, provision must be made for preventing the turning or rolling of the jar when it rests on its side. The cap shown at 11 is also readily obtainable to fit all Mason jars. This cap consists only of a screw-threaded collar with an inwardly directed annular flange having a large central opening. In its use as a cap for the Mason jars, a closure is provided for the central opening of the cap but this closure is not used with my mouse trap attachment.

The mouse trap attachment consists mainly of a disc 12 having a diameter slightly less than the internal diameter of the collar of the cap 11 and of a funnel 13 with a trap door 14 secured thereto. The funnel 13 communicates with an opening in the disc 12, and when cutting this opening a portion of the material is curved over the upper end of the funnel to constitute a shield 15. The trap door is best shown in Figure 1 and it consists of a metal 14$^a$ which is pivotally secured at 14$^b$ to the funnel 13 and of wire extensions 14$^c$ which pass through apertures in the lower upturned edge of the plate 14$^a$. The wire extensions are U-shaped and are secured at their upper ends in loops formed in the plate 14$^a$. The construction of the trap door is such that it combines strength with extreme lightness. The trap door is normally held by gravity in its closed position with the ends of the wire extensions touching the floor of the funnel 13. The upper wall of the funnel 13 is provided with an aperture at 16 for purposes which will be subsequently explained.

The trap is asembled in the manner indicated in Figures 2 and 3. The trap attachment may be applied first to either the Mason jar with the disc 12 covering the opening of the jar or to the cap 11 with the disc 12 seated therein and against the inturned annular flange. The cap 11 is then screwed into place on the jar for holding the trap attachment rigidly in its operative position.

In use, the trap is baited by placing the bait anywhere in the Mason jar. The mouse enters through the aperture in the disc 12 and passes into and through the funnel 13 as shown in Figure 4. The trap door offers but very slight resistance and is readily opened by a mouse as it passes through the funnel from the outside. The wire extensions 14$^c$ do not obstruct the mouse's view of the interior of the trap, so that the mouse has no occasion for alarm. After the mouse passes out of the funnel into the jar, the trap door falls by gravity into the position shown in Figure 1 and thus prevents the escape of the mouse. The funnel 13 seems, however, to offer a means of escape and the mouse on the first alarm will seize upon this as an exit. The trap door 14 remains closed and the mouse in passing through the funnel merely travels over the trap door until it reaches the aperture 16 of the funnel. The mouse goes through this aperture only to find itself again in the jar.

Mice have been observed to go round and round through the aperture 16 without discovering that the funnel does not offer an exit from the trap. Occasionally a mouse, shrewder than the rest, arrives at the conclusion that escape can be effected by opening the trap door. If the mouse attempts to do this from a position in the funnel at the end of the trap door, it will find that the door can be lifted only slightly. If the mouse attempts to leave through the slight opening thus afforded, it must travel against the resistance of the wire extensions 14°, the lower ends of which are sharply pointed. Finding escape impossible in this way, the mouse is apt to attempt to open the trap door from a position above the door. The shield 15, however, makes it difficult for the mouse to find a position above the door from which it can work freely and the door can be moved only a slight distance. When the door is opened from any position it is certain to fall back by gravity immediately after it is released. The opening movement of the door is of course limited by the upper wall of the funnel. This feature is especially important when the trap is to be used for catching and retaining rats and other animals of kinds which are shrewd to a remarkable degree. But for mice especially, the trap as described and illustrated possesses considerable fascination. Mice which are released almost invariably re-enter the trap, and it has been observed that the same mouse will repeatedly enter the trap as often as it is afforded the opportunity of doing so.

While I have shown and described the trap as designed for use as a mouse trap, I do not wish to be restricted to this use. In a slightly larger size it will be equally as effective for catching rats and gophers and other small animals which are not too large to enter a Mason jar. The trap may, in fact be built large enough for catching the larger animals as well, but in designing the trap for catching animals as large as rabbits or larger, it is necessary to provide a substitute for the Mason jar. Such a substitute may, of course, be especially designed but in some cases it may be improvised from milk cans or other containers which may happen to be available for the purpose.

Having thus described my invention in such full, clear, and exact terms that its construction and utility will be readily understood by others skilled in the art to which it pertains, what I claim as new and desire to secure by Letters Patent of the United States is:

1. An animal trap attachment for containers having an opening, said attachment comprising a plate for closing the opening of the container, said plate being provided with an opening, an inwardly projecting funnel secured to said plate in communication with the opening thereof, a gravity closing trap door within said funnel and pivotally secured thereto, said funnel being provided with an aperture in its upper wall adjacent the entrance of said funnel and above said gate, and a shield projecting from said plate and over a portion of the opening in the upper wall of the said funnel.

2. An animal trap attachment for containers having an opening, said attachment comprising a plate which is provided with an opening, means for releasably securing said plate to the container with the opening of said plate communicating with the opening of the container, an inwardly projecting funnel secured to said plate in communication with the opening thereof, a gravity closing trap door within said funnel and pivotally secured thereto, said funnel being provided in its upper wall with an opening above said gate, the upper wall of said funnel being adapted to serve as a stop for limiting the opening movement of said gate, and a shield integral with and projecting from said plate and over a portion of the opening in the upper wall of said funnel.

In testimony whereof I affix my signature.

CHARLES W. COGHILL.